United States Patent
Saito et al.

(10) Patent No.: US 11,651,166 B2
(45) Date of Patent: *May 16, 2023

(54) LEARNING DEVICE OF PHRASE GENERATION MODEL, PHRASE GENERATION DEVICE, METHOD, AND PROGRAM

(71) Applicant: NIPPON TELEGRAPH AND TELEPHONE CORPORATION, Tokyo (JP)

(72) Inventors: Itsumi Saito, Tokyo (JP); Kyosuke Nishida, Tokyo (JP); Hisako Asano, Tokyo (JP); Junji Tomita, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 149 days.

This patent is subject to a terminal disclaimer.

(21) Appl. No.: 16/977,422

(22) PCT Filed: Feb. 22, 2019

(86) PCT No.: PCT/JP2019/006812
§ 371 (c)(1),
(2) Date: Sep. 1, 2020

(87) PCT Pub. No.: WO2019/167835
PCT Pub. Date: Sep. 6, 2019

(65) Prior Publication Data
US 2021/0004541 A1    Jan. 7, 2021

(30) Foreign Application Priority Data
Mar. 2, 2018  (JP) .............................. JP2018-038054

(51) Int. Cl.
*G06F 40/40*   (2020.01)
*G06F 40/20*   (2020.01)
*G06N 3/02*    (2006.01)

(52) U.S. Cl.
CPC .............. *G06F 40/40* (2020.01); *G06F 40/20* (2020.01); *G06N 3/02* (2013.01)

(58) Field of Classification Search
None
See application file for complete search history.

(56) References Cited

U.S. PATENT DOCUMENTS

2016/0357854 A1* 12/2016 Hashimoto ......... G06F 16/3344
2021/0286948 A1*  9/2021 Kruengkrai ......... G06N 3/0454

FOREIGN PATENT DOCUMENTS

| JP | 2008-203964 A  |   | 9/2008 |
| JP | 2016-170636 A  |   | 9/2016 |
| JP | 2016170636 A   | * | 9/2016 |

OTHER PUBLICATIONS

Xiang Li, Aynaz Taheri, Lifu Tu, Kevin Gimpel, "Commonsense Knowledge Base Completion" Proceedings of the 54th Annual Meeting of the Association for Computational Linguistics, pp. 1445-1455, Berlin, Germany, Aug. 7-12, 2016. c 2016 Association for Computational Linguistics (Year: 2016).*

(Continued)

*Primary Examiner* — Richemond Dorvil
*Assistant Examiner* — Alexander G Marlow

(57) ABSTRACT

A learning device of a phrase generation model includes a memory; and a processor configured to execute learning the phrase generation model including an encoder and a decoder, by using, as training data, a 3-tuple. The 3-tuple includes a combination of phrases and at least one of a conjunctive expression representing a relationship between the phrases, and a relational label indicating the relationship represented by the conjunctive expression. The encoder is (Continued)

configured to convert a phrase into a vector from a 2-tuple. The 2-tuple includes a phrase and at least one of the conjunctive expression and the relational label. The decoder is configured to generate, from the converted vector and the conjunctive expression or the relational label, a phrase having the relationship represented by the conjunctive expression or the relational label with respect to the phrase.

6 Claims, 16 Drawing Sheets

(56) References Cited

OTHER PUBLICATIONS

Liwei Cai, William Yang Wang "KBGAN: Adversarial Learning for Knowledge Graph Embeddings" arXiv: 1711.04071v2 (Year: 2018).*
Ashish Vaswani, Noam Shazeer, Niki Parmar, Jakob Uszkoreit, Llion Jones, Aidan N. Gomez, Łukasz Kaiser, Illia Polosukhin. "Attention Is All You Need" arXiv:1706.03762v5 (Year: 2017).*
Maarten Sap, Ronan Le Bras, Emily Allaway, Chandra Bhagavatula, Nicholas Lourie, Hannah Rashkin, Brendan Roof, Noah A. Smith, Yejin Choi. "ATOMIC: An Atlas of Machine Commonsense for If-Then Reasoning" arXiv:1811.00146 (Year: 2018).*
Kenichi Otomo, et al., "Acquisition of knowledge of an inter-event relationship using co-occurrence information on predicate-argument structures and a distribution of inter-node relationships", Proc. of 17th annual meeting of the Association for Natural Language Processing (Mar. 2011), pp. 29-32.
Xiang Li et al., "Commonsense Knowledge Base Completion", Proc. of ACL, 2016, pp. 1445-1455.
Tomas Mikolov, et al., "Distributed Representations of Words and Phrases and their Compositionality", in Proceedings of NIPS, 2013, pp. 1-9.
Zhiyi Luo, et al., "Commonsense causal reasoning between short texts", in Proceedings of the Fifteenth International Conference on Principles of Knowledge Representation and Reasoning, KR'16, pp. 421-430. AAAI Press, 2016.
Jiwei Li, Michel Galley, Chris Brockett, Georgios Spithourakis, Jianfeng Gao, and Bill Dolan. "A persona-based neural conversation model", In Proceedings of the 54th Annual Meeting of the ACL, pp. 994-1003, 2016.
Piotr Bojanowski, et al., "Enriching word vectors with subword information", arXiv preprint arXiv: 1607.04606, 2016, pp. 135-146.
ISR for PCT/JP2019/006812, dated Feb. 22, 2019.
Cai et al. (2017) "KBGAN: Adversarial Learning for Knowledge Graph Embeddings" https://arxiv.org/abs/1711.04071v1.
Cai et al. (2018) "KBGAN: Adversarial Learning for Knowledge Graph Embeddings" https://arxiv.org/abs/1711.04071.

* cited by examiner

FIG.6 the cellphone was broken, therefore, xxx 5 is replaced with xxx 7.

the case of xxx was broken, therefore, replaced.

xxx was broken suddenly, can't be charged, and can't be turned on.

dropped xxx, and the cover was broken.

Mom's cellphone was broken, therefore, I went to DDD right away to buy a new one.

as the cellphone is now repaired, I have to use a replacement.

```
* 0 1D 1/2 2.003647
keitai  noun, sa-hen conjunctive, *, *, *, *, keitai, keitai, keitai
denwa  noun, sa-hen conjunctive, *, *, *, *, denwa, denwa, denwa
ga  particle, case particle, general, *, *, *, ga, ga, ga
* 1 4D 0/2 -0.363607
koware  verb, independent, *, *, ichi-dan, continuative form, kowareru, koware, koware
ta  auxiliary, *, *, *, special/ta, base form, ta, ta, ta
node  particle, conjunctive particle, *, *, *, *, node, node, node
* 2 4D 1/2 -0.363607
xxx  noun, general, *, *, *, *, *
5  noun, number, *, *, *, *, *
wo  particle, case particle, general, *, *, *, wo, wo, wo
* 3 4D 1/2 -0.363607
xxx  noun, general, *, *, *, *, *
7  noun, number, *, *, *, *, *
ni  particle, case particle, general, *, *, *, ni, ni, ni
* 4 -1D 0/2 0.000000
kaikae  verb, independent, *, *, ichi-dan, continuative form, kaikaeru, kaikae, kaikae
mashi  auxiliary, *, *, *, special/masu, continuative form, masu, mashi, mashi
ta  auxiliary, *, *, *, special/ta, base form, ta, ta, ta
。 mark, punctuation, *, *, *, *, 。, 。, 。
EOS
```

| Conjunctive expression |
|---|
| therefore |
| then |
| due to |
| ... |

(B)

| Conjunctive expression | Relational label |
|---|---|
| therefore | cause |
| then | cause |
| due to | cause |
| ... | ... |

LEARNING DEVICE OF PHRASE GENERATION MODEL, PHRASE GENERATION DEVICE, METHOD, AND PROGRAM

CROSS-REFERENCE TO RELATED APPLICATIONS

This application is a U.S. 371 Application of International Patent Application No. PCT/JP2019/006812, filed on 22 Feb. 2019, which application claims priority to and the benefit of JP Application No. 2018-038054, filed on 2 Mar. 2018, the disclosures of which are hereby incorporated herein by reference in their entireties.

TECHNICAL FIELD

The present invention relates to a learning device of a phrase generation model, a phrase generation device, a method, and a program.

BACKGROUND ART

There has been a relationship estimation technique that, in response to the given input of a 3-tuple of {phrase 1, phrase 2, label} constituted with two texts (hereafter, also referred to as phrases) and a relational label (hereafter, simply referred to as a label) representing the relationship between the texts, outputs a reliability score(hereafter, referred to as a relational score) of the combination of the three. The relational score is a numerical value to indicate a level of appropriateness of the combination of the 3-tuple {phrase 1, phrase 2, label} given as input.

Non-Patent Document 1 relates to a technique that takes a corpus as input, and uses co-occurrence information on predicate-argument structures and distribution of inter-node relationships, to obtain 3-tuples described above as knowledge of inter-event relationships.

Non-Patent Document 2 relates to a technique that performs learning on neural networks by using a large amount of manually generated 3-tuple data, to estimate relational scores.

RELATED ART DOCUMENTS

Non-Patent Documents

[Non-Patent Document 1] Kenichi Otomo, Tomohide Shibata, and Sadao Kurobashi, "Acquisition of knowledge of an inter-event relationship using co-occurrence information on predicate-argument structures and a distribution of inter-node relationships", Proc. of 17th annual meeting of the Association for Natural Language Processing (March 2011).
[Non-Patent Document 2] Xiang Li, Aynaz Taheri, Lifu Tu, Kevin Gimpel, "Commonsense Knowledge Base Completion", Proc. of ACL, 2016.

SUMMARY OF INVENTION

Problem to be Solved by the Invention

The conventional techniques take as input a 3-tuple of {phrase 1, phrase 2, label} in the relationship estimation, and learns a model for outputting a relational score. Therefore, in a case where it is desired to predict a phrase 2 from {phrase 1, label} as input, it is necessary to prepare a phrase 2, generate a combination of {phrase 1, phrase 2, label}, and then, calculate the relational score; this approach has a problem that it is not possible from {phrase 1, label} as input to generate a phrase 2 having a relationship defined by the phrase 1 and the label.

The present invention has been made to solve the above problem, and has an object to provide a learning device of a phrase generation model, a method, and a program that enables to learn a phrase generation model that can generate a phrase having a relationship with an input phrase.

The present invention also has an object to provide a phrase generation device, a method, and a program that can generate a phrase having a relationship with an input phrase

Means for Solving the Problem

In order to achieve the above object, a learning device of a phrase generation model according to the present invention is configured to include a learning unit to learn the phrase generation model, by using, as training data, a 3-tuple constituted with a combination of phrases and at least one of a conjunctive expression representing a relationship between the phrases, and a relational label indicating the relationship represented by the conjunctive expression. The phrase generation model includes an encoder and a decoder. The encoder is configured to convert a phrase into a vector from a 2-tuple constituted with a phrase and at least one of the conjunctive expression and the relational label indicating the relationship represented by the conjunctive expression. The decoder is configured to generate, from the converted vector and the conjunctive expression or the relational label indicating the relationship represented by the conjunctive expression, a phrase having the relationship represented by the conjunctive expression or the relational label with respect to the phrase.

A method of learning a phrase generation model according to the present invention is executed by a learning unit. The method includes learning the phrase generation model, by using, as training data, a 3-tuple constituted with a combination of phrases and at least one of a conjunctive expression representing a relationship between the phrases, and a relational label indicating the relationship represented by the conjunctive expression. The phrase generation model includes an encoder and a decoder. The encoder is configured to convert a phrase into a vector from a 2-tuple constituted with a phrase and at least one of the conjunctive expression and the relational label indicating the relationship represented by the conjunctive expression. The decoder is configured to generate, from the converted vector and the conjunctive expression or the relational label indicating the relationship represented by the conjunctive expression, a phrase having the relationship represented by the conjunctive expression or the relational label with respect to the phrase.

Also, a phrase generation device according to the present invention includes a phrase generation unit configured to receive as input a 2-tuple constituted with an input phrase and at least one of a conjunctive expression or a relational label representing a relationship between phrases, and to generate a phrase having the relationship represented by the conjunctive expression or the relational label with respect to the input phrase, based on a phrase generation model that have learned in advance.

A method of generating a phrase according to the present invention is executed by a phrase generation unit configured to receive as input a 2-tuple constituted with an input phrase and at least one of a conjunctive expression or a relational label representing a relationship between phrases, and to generate a phrase having the relationship represented by the conjunctive expression or the relational label with respect to the input phrase, based on a phrase generation model that have learned in advance.

A program according to the present invention is a program for causing a computer to function as the respective units of the learning device of a phrase generation model, or of the phrase generation device as according to the inventions described above.

Advantage of the Invention

According to a learning device of a phrase generation model, a method, and a program according to the present invention, an effect is obtained such that by learning a phrase generation model that includes an encoder configured to convert a phrase into a vector and a decoder configured to generate, from the converted vector and a relational label indicating the conjunctive expression or a relationship represented by the conjunctive expression, a phrase having the relationship represented by the conjunctive expression or the relational label with respect to the phrase, it is possible to learn the phrase generation model that can generate a phrase having the relationship with an input phrase.

According to a phrase generation device, a method, and a program according to the present invention, an effect is obtained such that it is possible to generate a phrase having a relationship with an input phrase, from a 2-tuple constituted with a phrase and at least one of a relational label indicating a conjunctive expression or a relationship represented by the conjunctive expression, based on a phrase generation model.

BRIEF DESCRIPTION OF DRAWINGS

FIG. 6 is a diagram illustrating an example of an input text;

FIG. 7 is a diagram illustrating an example of results of dependency structure analysis;

FIG. 8 is a diagram illustrating an example of a conjunctive expression database;

EMBODIMENTS OF THE INVENTION

In the following, embodiments according to the present invention will be described in detail with reference to the drawings.

First Embodiment

Overview of the First Embodiment According to the Present Invention

In the relationship estimation, when a 3-tuple of {phrase 1, phrase 2, label} constituted with two texts and a label, where the label is a conjunctive expression or a relational label representing a relationship between the texts, is given as input, a reliability score of the combination of the three (hereafter, referred to as a relational score) is output.

Here, the conjunctive expression is no less than an expression that represents a relationship in a sentence, such as "therefore", and the relational label is a label that represents a relationship such as "reason" or "result", which abstracts the meaning of a conjunctive expression. The label is a superordinate concept that includes the conjunctive expression and the relational label, and is label data such as "therefore" and "reason".

For example, a 3-tuple as input may be {text 1: rain falls, text 2: the ground becomes wet, label: result}, and the output is a relational score.

In the present embodiment, a method of estimating whether a label is appropriate as a relationship between two texts will be described Also, in an embodiment according to the present invention, starting from a conjunctive expression and using a dependency structure, a 3-tuple of phrases and a conjunctive expression that connects the phrases is extracted. Then, by using 3-tuples extracted as such, a relationship estimation model is learned, which is a neural network model for estimating a relationship.

Figure 1:
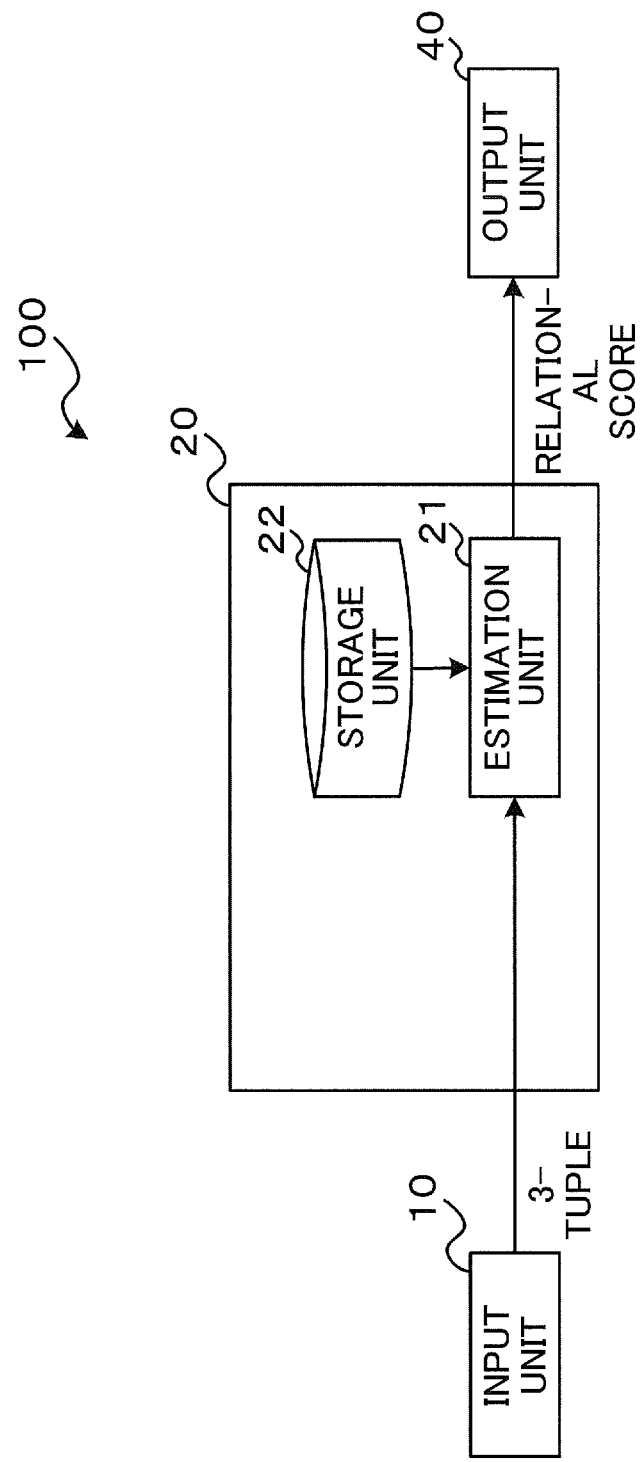
FIG. 1 is a block diagram illustrating a configuration of a relationship estimation device in a first embodiment according to the present invention.

Configuration of a Relationship Estimation Device in the First Embodiment According to the Present Invention Next, a configuration of a relationship estimation device in the first embodiment according to the present invention will be described. As illustrated in FIG. 1, a relationship estimation device 100 in the first embodiment according to the present invention can be configured with a computer that includes a CPU, a RAM, and a ROM storing a program and various items of data for executing a processing routine of relationship estimation, which will be described later. As illustrated in FIG. 1, this relationship estimation device 100 functionally includes an input unit 10, an arithmetic/logic unit 20, and an output unit 40.

The input unit 10 receives a 3-tuple of {phrase 1, phrase 2, label} constituted with two phrases (texts) and a label as a conjunctive expression that represents a relationship between the phrases.

Note that in the present embodiment, a case will be described as an example, in which a conjunctive expression itself is used as a label to represent a relationship between two texts included in a 3-tuple.

The arithmetic/logic unit 20 includes an estimation unit 21 and a memory 22.

A relationship estimation model learned by a learning device of a relationship estimation model 150, which will be described later, is stored in the memory 22.

Neural networks are used for a relationship estimation model, and the learning method will be described with the learning device of a relationship estimation model 150. Any neural network can be used. Also, although other methods of machine learning may be used, neural networks are more effective.

The estimation unit 21 uses a relationship estimation model stored in the memory 22 to estimate the relational score for an input 3-tuple, and causes the output unit 40 to output the score.

The relational score is a numerical value that indicates whether there is a relationship between two phrases in a 3-tuple given as input. For example, the score takes a value between 0 and 1, assuming that a value closer to 1 indicates a closer relationship.

Processing performed by the estimation unit 21 will be described in the following.

First, each of three input items of {phrase 1, phrase 2, label} is converted into a vector.

The vector of the converted phrase 1 is denoted as h, the vector of the phrase 2 is denoted as t, and the vector of the conjunctive expression is denoted as r. Any conversion method can be used as long as being a method of vectorizing phrases or words. The present embodiment uses a method described in Reference 1.
[Reference 1] Tomas Mikolov, Ilya Sutskover, Kai Chen, Greg Corrado, and Jeffrey Dean, "Distributed Representations of Words and Phrases and their Compositionality", in Proceedings of NIPS, 2013.

As the method of calculating a relational score, the following two methods may be considered.
(Score Calculation Method 1)

Figure 2:
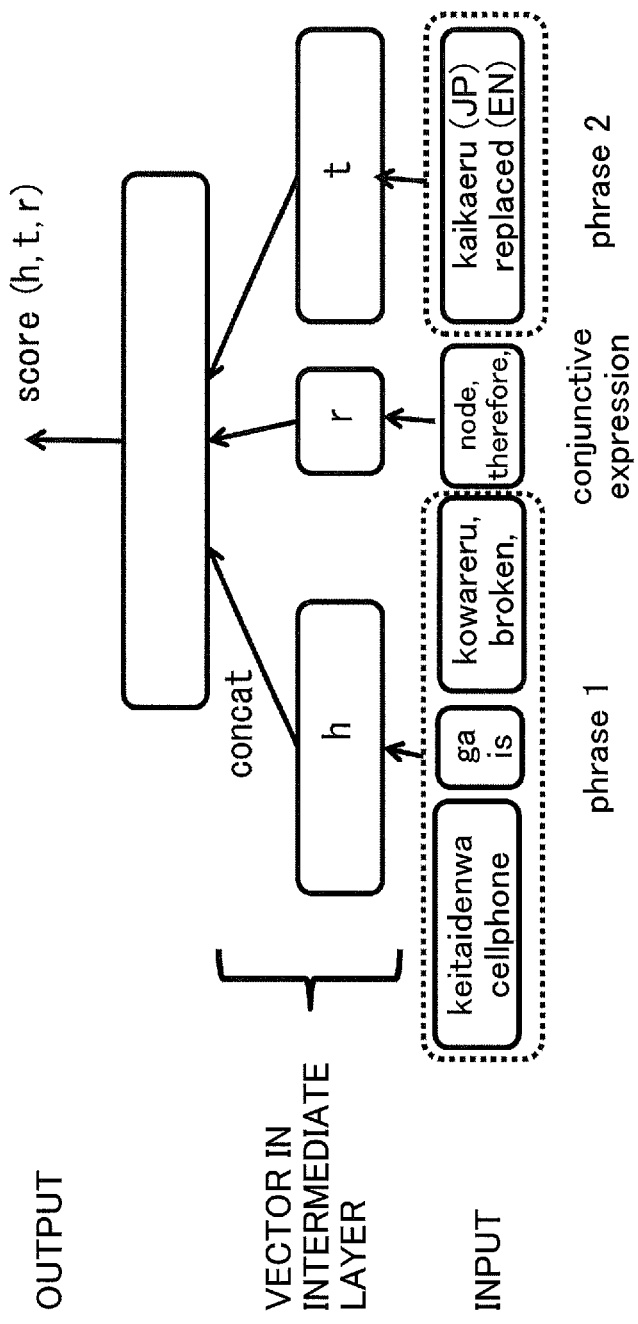
FIG. 2 is a diagram illustrating a method of calculating a relational score.

As illustrated in FIG. 2, this method concatenates h, t, and r, and by using a multi-layer perceptron, outputs a relational score(h, t, r), which is a one-dimensional output value.
(Score Calculation Method 2)

Figure 3:
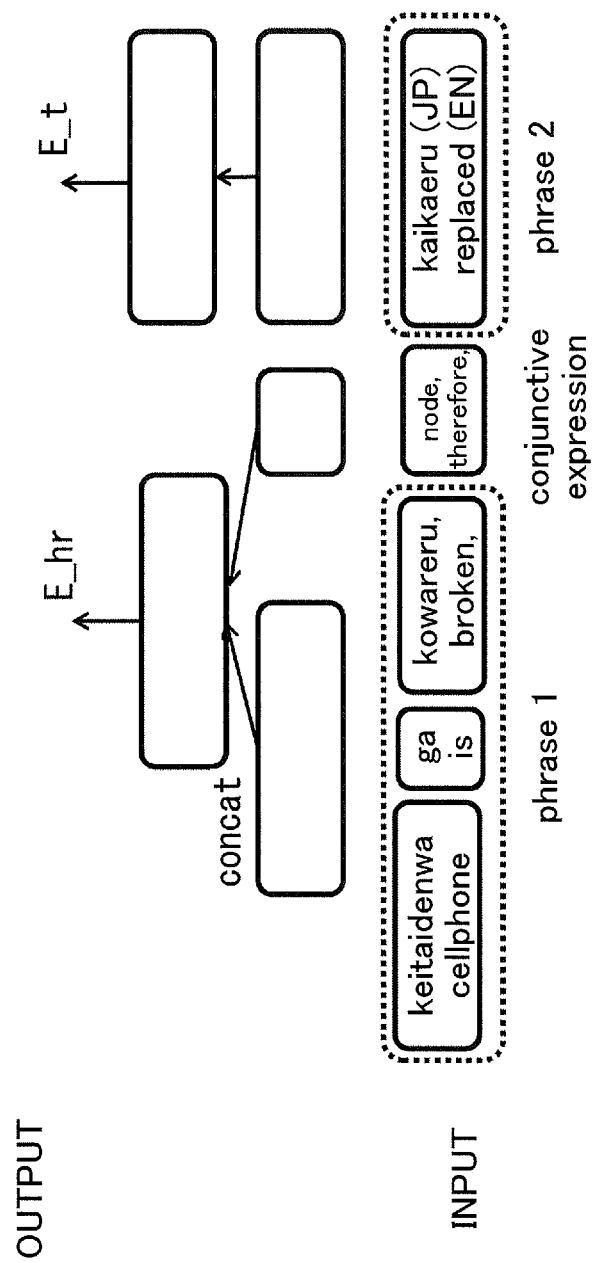
FIG. 3 is a diagram illustrating a method of calculating a relational score.

As illustrated in FIG. 3, this method concatenates h and r; outputs an r-dimensional vector E_hr by using a multi-layer perceptron; outputs from t an r-dimensional vector E_t by using a multi-layer perceptron; and calculates a relational score according to proximity between E_hr and E_t. For example, cosine similarity may be used as the proximity between both vectors.

For example, the estimation unit 21 outputs a relational score of 0.87 for the 3-tuple of {phrase 1: rain falls, phrase 2: the ground becomes wet, label: therefore}.

Also, the estimation unit 21 compares the output relational score with a predetermined threshold, to estimate whether or not the phrase 1 and the phrase 2 have a relationship representing a "result" indicated by "therefore".

For example, in the case where the relational score is 0.6 and the threshold is 0.4, as being 0.6>0.4, it is estimated that the phrases have the relationship. However, such a threshold-based determination is performed in the case where knowledge acquisition or normalization of the score to 0/1 is required; therefore, depending on the application, the relational score may be output as it is without performing the threshold-based determination.

Figure 4:
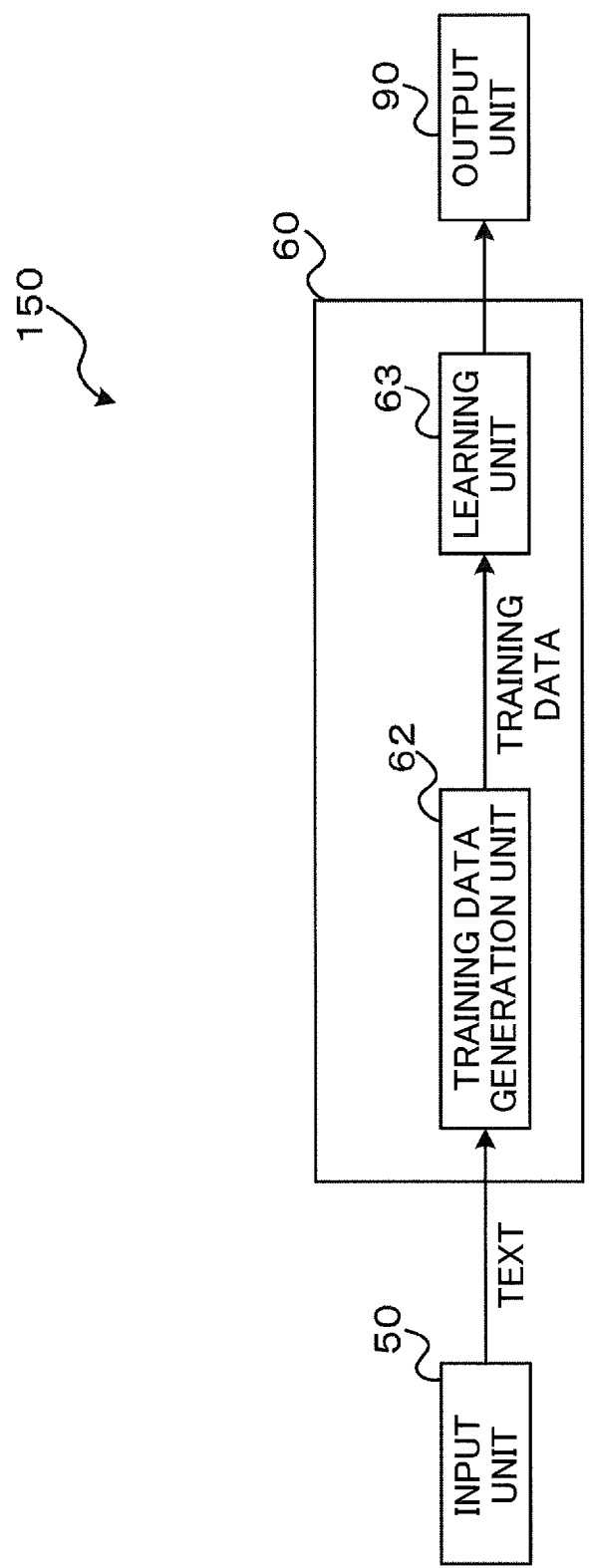
FIG. 4 is a block diagram illustrating a configuration of a learning device of a relationship estimation model in the first embodiment according to the present invention.

Configuration of a Learning Device of a
Relationship Estimation Model in the First
Embodiment According to the Present Invention Next, a configuration of a learning device of a relationship estimation model in the first embodiment according to the present invention will be described. As illustrated in FIG. 4, the learning device of a relationship estimation model 150 in the embodiment according to the present invention can be configured with a computer that includes a CPU, a RAM, and a ROM storing a program and various items of data for executing a processing routine of learning a relationship estimation model, which will be described later. As illustrated in FIG. 4, this learning device of a relationship estimation model 150 functionally includes an input unit 50, an arithmetic/logic unit 60, and an output unit 90.

The input unit 50 receives an input text.

The arithmetic/logic unit 60 includes a training data generation unit 62 and a learning unit 63.

Figure 5:
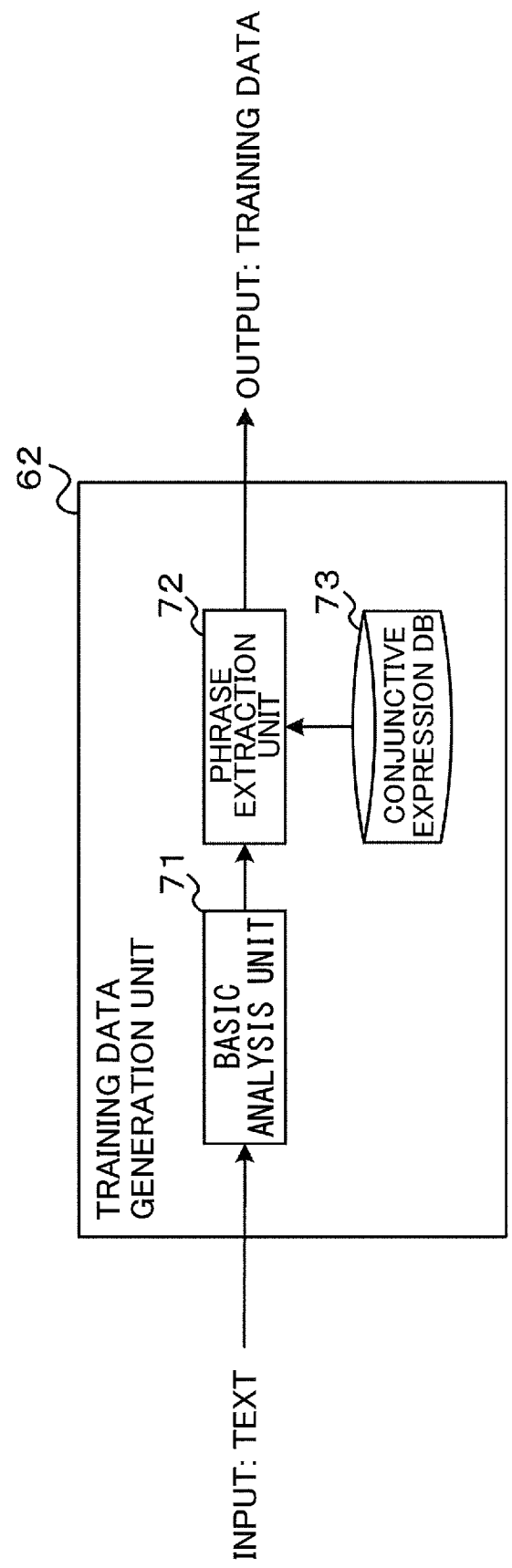
FIG. 5 is a block diagram illustrating a configuration of a training data generation unit of a learning device of a relationship estimation model in the first embodiment according to the present invention.

As illustrated in FIG. 5, the training data generation unit 62 includes a basic analysis unit 71, a phrase extraction unit 72, and a conjunctive expression database 73.

The basic analysis unit 71 performs dependency structure analysis with respect to the input text.

FIG. 6 illustrates an example of an input text (translated in English), and FIG. 7 illustrates an example of results of the dependency structure analysis (in Japanese). Any tool of dependency structure analysis may be used; for example, a known morphological analyzer called CaboCha may be used.

The phrase extraction unit 72 extracts phrases from results of the dependency structure analysis. In the present embodiment, it is assumed that a phrase includes a subject and a predicate having a dependency relationship as the minimum unit, and up to n adjective clauses (where n is a natural number).

Taking FIG. 7 mentioned above as an example of results of the dependency structure analysis, the following phrases are extracted. When extracting phrases, the base forms of words in the analysis results may be used (though not necessarily), to extract those as converted forms such as "broken"→"break", "replaced"→"replace", and the like.
the cellphone was broken
replaced
replaced with xxx 7
xxx 5 is replaced Note that when extracting phrases, in principle, a combination of a subject and a verb is the basic unit, although for a so-called sa-hen nominal verb in Japanese, the single word is allowed.

Also, strings before and after a conjunctive expression may be extracted as respective phrases without considering the dependency relationship. For example, in the case of a sentence "aaaa[conjunctive expression]bbbb", "aaaa" and "bbbb" may be extracted as the respective phrases. In this case, [conjunctive expression] represents a clause including a conjunctive expression, and "aaaa" and "bbbb" represent phrases that have a before-and-after positional relationship interposing the clause including the conjunctive expression in-between.

Then, from among combinations of phrases described above, the phrase extraction unit 72 extracts a phrase that has a dependency relationship with a clause that includes a conjunctive expression, and generates a 3-tuple constituted with {phrase 1, phrase 2, conjunctive expression}.

Each conjunctive expression used as a label in the present embodiment is assumed to be defined in advance as an expression indicating a relationship between phrases. For example, conjunctives such as "therefore", "hence", "for", "and", "if", "in case", "when", "upon", "provided", "assuming", "but", and the like can be used as conjunctive expressions. In the present embodiment, as illustrated in FIG. 8(A), it is assumed that conjunctive expressions are registered in advance in the conjunctive expression database 73.

In the example of the results of the dependency structure analysis illustrated in FIG. 7 described above, the following 3-tuples are generated.
{the cellphone was broken, replaced, therefore}
{the cellphone was broken, replaced with xxx7, therefore}
{the cellphone was broken, xxx5 is replaced, therefore}

Assuming that there are N types of conjunctive expressions, up to N types of labels may appear in the final 3-tuples.

Also, as another embodiment of the phrase extraction unit 72, other than the method of extracting and outputting 3-tuples as they are as described above (referred to as Extraction method 1), there are three processing methods after the extraction, as follows.
(Extraction Method 2)

As illustrated in FIG. 8(B), it is assumed that conjunctive expressions and relational labels each indicating a relationship represented by a conjunctive expression are registered in advance in the conjunctive expression database 73.

By using the conjunctive expression database 73, the conjunctive expression is converted into a relational label, to be output as {phrase 1, phrase 2, relational label}.

In the example of the results of the dependency structure analysis illustrated in FIG. 7 described above, the following 3-tuples are generated.
{the cellphone was broken, replaced, cause}
{the cellphone was broken, replaced with xxx7, cause}
{the cellphone was broken, xxx5 is replaced, cause}

Assuming that there are M types of relational labels, up to M types of labels may appear in the final output.

In the case of using the extraction method 2 described above, a 3-tuple input into the relationship estimation device 100 has a form of {phrase 1, phrase 2, relational label}.
(Extraction Method 3)

This method outputs {phrase 1, phrase 2, relational label} in which a conjunctive expression is manually converted into a relational label, together with {phrase 1, phrase 2, relational label} obtained by the extraction method 2. Up to M types of labels may appear in the final output.

In the case of using the extraction method 3 described above, a 3-tuple input into the relationship estimation device 100 has a form of {phrase 1, phrase 2, relational label}.
(Extraction Method 4)

This method outputs {phrase 1, phrase 2, relational label} in which a conjunctive expression is manually converted into a relational label, together with {phrase 1, phrase 2, conjunctive expression} obtained by the extraction method 1. Up to N+M types of labels may appear in the final output.

In the case of using the extraction method 4 described above, a 3-tuple input into the relationship estimation device 100 has a form of {phrase 1, phrase 2, conjunctive expression} or {phrase 1, phrase 2, relational label}.

Note that in the extraction methods 1 to 4 described above, although a 3-tuple of {phrase 1, phrase 2, relational label} is extracted using results of dependency structure analysis of a document in Japanese, for example, in the case of a document in English, a 3-tuple may be extracted using a method described in Reference 2.
[Reference 2]
Zhiyi Luo, Yuchen Sha, Kenny Q. Zhu, Seung-won Hwang, and Zhongyuan Wang, "Commonsense causal reasoning between short texts", in Proceedings of the Fifteenth International Conference on Principles of Knowledge Representation and Reasoning, KR'16, pages 421-430. AAAI Press, 2016.

However, 3-tuples do not necessarily need to be extracted from documents in Japanese or English; the embodiments according to the present invention can use 3-tuples extracted from documents in any language.

The learning unit 63 learns a relationship estimation model by using 3-tuples of {phrase 1, phrase 2, label} extracted by the training data generation unit 62 as correct answer data in the learning.

As described earlier, the relationship estimation model uses a neural network (hereafter, also referred to as NN) such as a multi-layer perceptron to perform loss calculation using the following method, so as to update the parameters of the NN.

Note that data used for learning is added with negative examples upon usage, wherein a negative example is obtained from a 3-tuple as a positive example by randomly replacing one of the elements.
(Loss Calculation Method 1)

In accordance with the relational score calculation method 1 described above, loss calculation is performed by using the following formula.

$$\text{Loss\_triple(hinge)} = \Sigma \max(0, 1 + \text{score}(h, t, r) \cdot \text{score}(h', t', r')) \quad \text{[Formula 1]}$$

where score(h', t', r') represents the score of a negative example. For the loss calculation, it is possible to use hinge loss, sigmoid loss, softmax loss, or the like.
(Loss Calculation Method 2)

In accordance with the relational score calculation method 2 described above, loss calculation is performed by using the following formula.

$$\text{Loss\_triple(hinge)} = \Sigma \max(0, 1 - \|E\_hr - E\_t\| - \|E\_h'r' - E\_t'\|) \quad \text{[Formula 2]}$$

where E_h'r'−E_t' represents the score of a negative example. For the loss calculation, it is possible to use hinge loss, sigmoid loss, softmax loss, or the like.

Figure 9:
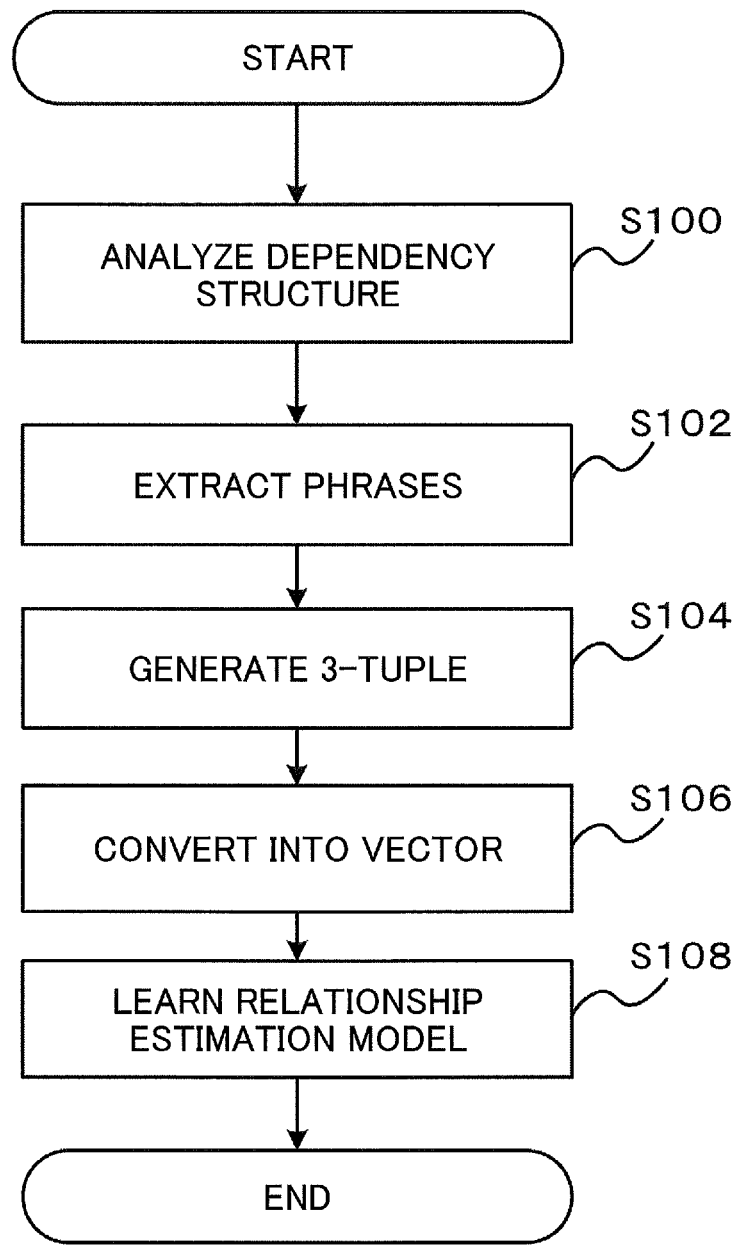
FIG. 9 is a flow chart illustrating a processing routine of learning a relationship estimation model in a learning device of a relationship estimation model in the first embodiment according to the present invention.

Operations of the Learning Device of a Relationship Estimation Model in the First Embodiment According to the Present Invention Next, operations of the learning device of a relationship estimation model 150 in the first embodiment according to the present invention will be described. Once having received an input text by the input unit 50, the learning device of a relationship estimation model 150 executes a processing routine of learning a relationship estimation model illustrated in FIG. 9.

First, at Step S100, the device 150 performs dependency structure analysis with respect to the input text.

Then, at Step S102, based on results of the dependency structure analysis with respect to the input text, the device 150 extracts phrases.

At Step S104, from among combinations of phrases extracted at Step S102 described above, the device 150 extracts a phrase that has a dependency relationship with a phrase that includes a conjunctive expression, and generates a 3-tuple constituted with {phrase 1, phrase 2, label}.

At Step S106, the device 150 converts each of the phrase 1, phrase 2, and label included in the 3-tuple generated at Step S104 described above, into a vector.

Then, at Step S108, the device 150 learns a relationship estimation model by using the results of the conversion of the 3-tuple of {phrase 1, phrase 2, label} into vectors as correct answer data in the learning, and ends the processing routine of learning a relationship estimation model.

Figure 10:
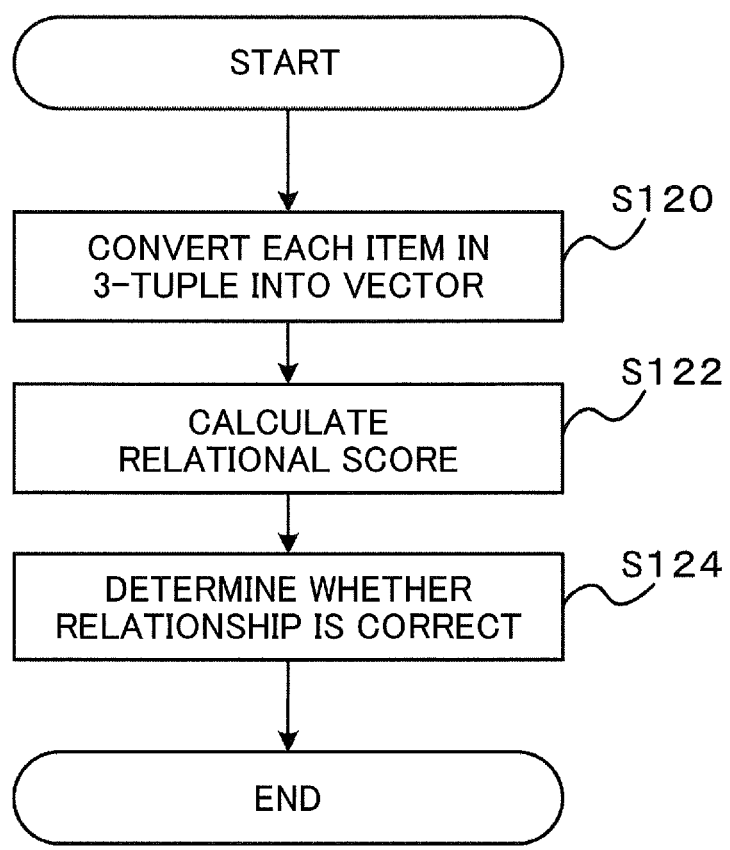
FIG. 10 is a flow chart illustrating a processing routine of relationship estimation in a learning device of relationship estimation in the first embodiment according to the present invention.

Operations of Relationship Estimation Device in the First Embodiment According to the Present Invention Next, operations of the relationship estimation device 100 in the first embodiment according to the present invention will be described. When the relationship estimation device 100 receives as input a relationship estimation model learned in advance by the learning device of a relationship estimation model 150, the relationship estimation device 100 stores the relationship estimation model in the memory 22. Then, when the input unit 10 receives a 3-tuple of {phrase 1, phrase 2, label} to be estimated, the relationship estimation device 100 executes a processing routine of relationship estimation illustrated in FIG. 10.

At Step S120, the device 100 converts each of the phrase 1, phrase 2, and label included in the 3-tuple received by the input unit 10, into a vector.

At Step S122, the device 100 calculates a relational score based on the results of the conversion of the 3-tuple of {phrase 1, phrase 2, label} into the vectors, and the relationship estimation model.

At Step S124, the device 100 determines whether or not the relational score calculated at Step S122 described above is greater than or equal to a predetermined threshold, so as to determine whether or not there is a relationship between the phrase 1 and the phrase 2 as indicated by the label, and causes the output unit 40 to output the determination result, and ends the processing routine of relationship estimation.

As described above, according to the learning device of a relationship estimation model in the first embodiment according to the present invention, based on results of dependency structure analysis with respect to an input text, by extracting a combination of phrases having a dependency relationship with a clause including a conjunctive expression that indicates the relationship between the phrases, and by generating a 3-tuple constituted with the combination of phrases and the conjunctive expression or the relational label, without spending a cost in generating training data, it is possible to learn a relationship estimation model that can precisely estimate the relationship between the phrases.

Also, in the case of using the extraction method 1 or 2 described above, by constructing a model for estimating neural relationship knowledge of phrases with data of 3-tuples extracted from an input text using conjunctive expressions as training data, without creating data manually, it is possible to model a neural relationship based on the conjunctive expressions. Also, it is possible to construct a model for calculating the relational score for a predetermined relational label and a 3-tuple of any phrases without manually created correct answers.

In the case of using the extraction method 2 described above, instead of a conjunctive expression itself such as "therefore", it is possible to estimate an abstracted relationship such as "cause".

Also, in the case of using the extraction method 3 described above, even in the case where a conjunctive expression and a relational label do not have a one-to-one correspondence (e.g., a conjunctive expression of "for" and a relational label of "cause" or "purpose"), it is possible to correct an error based on data given manually so as to perform learning.

Also, in the case of using the extraction method 4 described above, it is possible to estimate both a conjunctive expression itself such as "therefore", and an abstracted relationship such as "cause". Also, the effect of the extraction method 3 can also be obtained. In a pattern of mixing manually corresponded labels and conjunctive expressions, it is possible to make a model that takes into account reliable labels that can be converted manually, and the other labels at the same time.

Also, according to the relationship estimation device in the first embodiment according to the present invention, it is possible to precisely estimate the relationship between phrases.

Second Embodiment

Principles of the Second Embodiment According to the Present Invention

Figure 11:
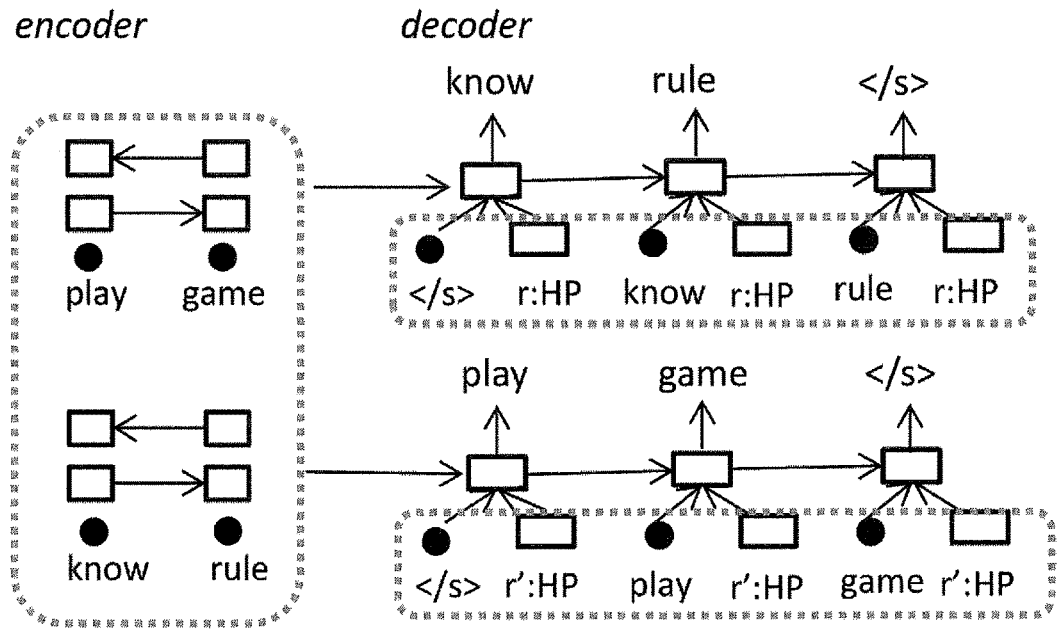
FIG. 11 is a diagram illustrating an example of a phrase generation model.

First, a model for generating a phrase having a relationship with an input phrase will be described. In the present embodiment, in order to generate a phrase, an attention-based encoder-decoder model in a neural network is used as a phrase generation model (see FIG. 11). Further, in addition to the conventional attention-based encoder-decoder model, the present model takes information on the relational label into account, and in this regard, is different from the conventional model. The encoder-decoder model is a neural network that is constituted with a neural network (this will be referred to as an "encoder") that has a function of converting information corresponding to a text into an intermediate state (a sequence of vectors, hereafter, also referred to as an intermediate output), and a neural network (this will be referred to as a "decoder") that has a function of converting an intermediate output into a text. The decoder uses a label r as the input each time.

In the present embodiment, in addition to a sequence of words of a phrase, information on the label r is present; therefore, an encoder-decoder model is constructed to take the relational label into account. Here, denoting a sequence of word vectors of an input phrase by $X=(x_1, x_2, \ldots, x_J)$, and a sequence of word vectors of an output phrase by $Y=(y_1, y_2, \ldots, y_T)$, the probability of outputting Y can be formulated as follows.

[Formula 3]

$$p(Y|X, \theta) = \prod_{t=1}^{T} p(y_t | y_{<t}, c_t, r) \qquad (1)$$

-continued $$p(y_t | y_{<t}, c_t, r) = g(y_{t-1}, s_t, c_t, r) \quad (2)$$

$$s_t = LSTM(concat(v_{y_{t-1}}, v_r), s_{t-1}) \quad (3)$$

where $x_j$ and $y_t$ are vectors of predetermined dimensions converted from words in the input/output phrases. As the method of converting words into vectors of predetermined dimensions, a general conversion method used when inputting words into a neural network may be adopted. The input/output phrases become sequences of word vectors.

Also, $v_r$ represents a vector of predetermined dimensions corresponding to a label. A label is converted into a vector, for example, as follows:
1. Assume that there are M types of labels, and each label is assigned a number in a range from 1 to M.
2. The vector $v_r$ is obtained by weighting an M-dimensional one-hot vector r, in which an element indexed with the number assigned to the label is 1 and the other elements are 0, using the parameter matrix of a neural network.

Parameters of a neural network used as described above when converting words and labels into vector representations used in the neural network will be referred to as an embedding.

Also, $c_t$ represents a context vector weighted with the attention on the input side, and $s_t$ represents an intermediate output of a hidden layer of an LSTM. As expressed above, $v_r$ is concatenated to be used as an input to the decoder. Although similar methods as such that input labels as additional information into the decoder side have been proposed in Reference 3 and the like, there has been no method that proposes a model as in the present configuration for generating phrases. The parameter θ represents a set of learnable parameters of the neural network and is determined by learning.

[Reference 3]
Jiwei Li, Michel Galley, Chris Brockett, Georgios Spithourakis, Jianfeng Gao, and Bill Dolan. A persona-based neural conversation model. In Proceedings of the 54th Annual Meeting of the ACL, pp. 994-1003, 2016.

In the present embodiment, the parameters of the encoder-decoder model of the phrase generation device 200 need to be learned in advance. At that time, 3-tuple data is used as training data. In the case of 3-tuple data, no problem arises with inputting either of the phrases, therefore, learning is performed in the case of using a tuple of {phrase 1, phrase 2, label} to estimate {phrase 2} from {phrase 1, label: r} as input; and in the case of estimating {phrase 1} from {phrase 2, label: r'} as input in which the input and output are exchanged. in these cases, as the relationship represented by a label has a direction, a new label r' in the reverse direction is introduced. Therefore, in the encoder-decoder model, the level of vocabulary with respect to relational labels is two times higher than that of the original labels.

Also, the loss function $L_{encdec}$ of the encoder-decoder is expressed as follows, by using the cross entropy function as in the case of a normal encoder-decoder model.

[Formula 4]

$$L_{encdec} = -\frac{1}{N} \sum_{n=1}^{N} \sum_{t=1}^{T} \log p(y_t^{(n)} | y_{<t}^{(n)}, c_t^{(n)}, r^{(n)}) \quad (4)$$

where N represents the number of data items, L represents the number of words in a phrase Y of the output side, $c_t$ represents a context vector of the input side, and r represents a label.

Figure 12:
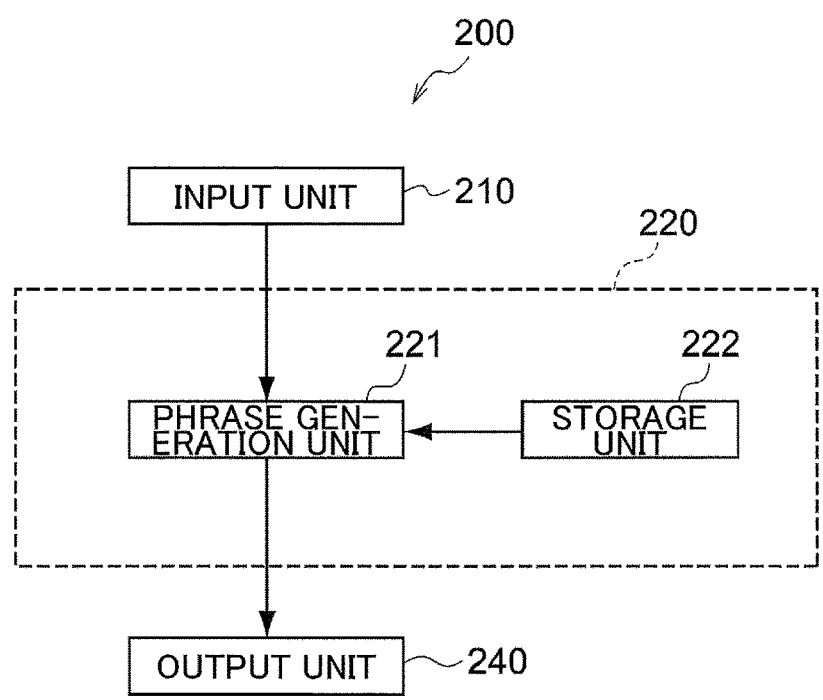
FIG. 12 is a block diagram illustrating a configuration of a phrase generation device in a second embodiment according to the present invention.

Configuration of the Phrase Generation Device in the Second Embodiment According to the Present Invention Next, a configuration of the phrase generation device in the second embodiment according to the present invention will be described. As illustrated in FIG. 12, the phrase generation device 200 in the second embodiment according to the present invention can be configured with a computer that includes a CPU, a RAM, and a ROM storing a program and various items of data for executing a processing routine of phrase generation, which will be described later. As illustrated in FIG. 12, this phrase generation device 200 functionally includes an input unit 210, an arithmetic/logic unit 220, and an output unit 240.

The input unit 210 receives a 2-tuple constituted with an input phrase (text) and a label that represents a relationship between the phrases.

The arithmetic/logic unit 220 includes a phrase generation unit 221 and a memory 222.

A phrase generation model learned by a learning device of a phrase generation model, which will be described later, is stored in the memory 222.

As the phrase generation model, an attention-based encoder-decoder model is used as described above (see FIG. 11 above), and the learning method will be described with the learning device of a phrase generation model.

The phrase generation unit 221 uses a phrase generation model stored in the memory 222 to generate a phrase that has a relationship indicated by the label with respect to the input phrase of the input 2-tuple, and causes the output unit 240 to output the generated phrase.

Specifically, first, the phrase generation unit 221 converts the input phrase into a vector by the LSTM of the encoder; uses the attention-based decoder to generates a phrase from the converted vector and the vector representing the input label; and outputs the generate phrase as a phrase having the relationship indicated by the label with respect to the input phrase.

Configuration of the Learning Device of a Phrase Generation Model in the Second Embodiment According to the Present Invention Next, a configuration of the learning device of a phrase generation model in the second embodiment according to the present invention will be described. Note that the configuration of the learning device of a phrase generation model is substantially the same as that of the learning device of a relationship estimation model 150 in the first embodiment; therefore, the same reference numerals are assigned to omit the description.

The learning device of a phrase generation model in the second embodiment according to the present invention includes an input unit 50, an arithmetic/logic unit 60, and an output unit 90.

The learning unit 63 of the arithmetic/logic unit 60 learns a phrase generation model by using 3-tuples of {phrase 1, phrase 2, label} extracted by the training data generation unit 62 as training data.

As described above, it is assumed that the phrase generation model uses an attention-based encoder-decoder model to calculate the loss function as expressed in Formula (4) above, to update the parameters of the encoder and decoder.

Also, when there is a 3-tuple of {phrase 1, phrase 2, label}, a single phrase generation model is used for learning generation of the phrase 2 from a 2-tuple of {phrase 1, label}, and generation of the phrase 1 from a 2-tuple of {phrase 2, label}.

In order to handle the bidirectional relationship in a single phrase generation model, a label in the reverse direction is defined, and model learning is performed with the doubled label space.

When the label is $r=r_k$ for the conjunctive expression in the original 3-tuple, the label in the reverse direction is treated as a new label $r_k'$.

For example, when there is a 3-tuple of {phrase 1=take an exam, phrase 2=study, label=for}, two 2-tuples are generated as follows, to be used as training data.

2-tuple of {take an exam, for}→study 2-tuple of {study, for'}→take an exam

Operations of the Learning Device of a Phrase Generation Model in the Second Embodiment According to the Present Invention Next, operations of the learning device of a phrase generation model in the second embodiment according to the present invention will be described. Once having received an input text by the input unit 50, the learning device of a phrase generation model executes a processing routine similar to the processing routine of learning a relationship estimation model illustrated in FIG. 9 described above, and learns a phrase generation model by using a 2-tuple of {phrase 1, label}→phrase 2, a 2-tuple of {phrase 2, label'}→phrase 1 obtained from the generated 3-tuple of {phrase 1, phrase 2, label}, as correct answer data in the learning.

Figure 13:
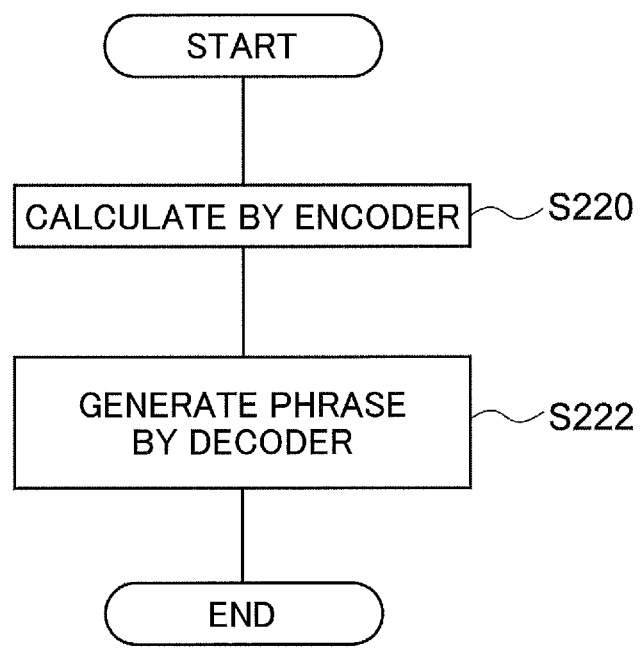
FIG. 13 is a flow chart illustrating a processing routine of phrase generation in a phrase generation device in the second embodiment according to the present invention.

Operations of the Phrase Generation Device in the Second Embodiment According to the Present Invention Next, operations of the phrase generation device 200 in the second embodiment according to the present invention will be described. When a phrase generation model learned in advance by the learning device of a phrase generation model is input into the phrase generation device 200, the phrase generation device 200 stores the phrase generation model in the memory 222. Then, when the input unit 210 receives a 2-tuple of {phrase 1, label} to be estimated, the phrase generation device 200 executes a processing routine of phrase generation illustrated in FIG. 13.

At Step S220, the phrase generation device 200 converts the phrase 1 included in the 2-tuple received by the input unit 210 into a vector by the LSTM of the encoder of the phrase generation model.

At Step S222, the phrase generation device 200 uses the attention-based decoder of the phrase generation model to generate a phrase from the vector converted at Step S220 and the vector representing the label included in the 2-tuple; causes the output unit 240 to output a phrase 2 having a relationship indicated by the label with respect to the phrase 1; and ends the processing routine of phrase generation.

As described above, according to the learning device of a phrase generation model in the second embodiment according to the present invention, by learning a phrase generation model that includes an encoder configured to convert a phrase into a vector; and a decoder configured to generate, from the converted vector and the conjunctive expression or the relational label, a phrase having the relationship represented by the conjunctive expression or the relational label with respect to the phrase, it is possible to learn the phrase generation model that can generate a phrase having the relationship with an input phrase.

Also, conventionally, it has been necessary to prepare candidate phrases in advance; however, it is now possible to learn a phrase generation model in which a phrase having a relationship can be generated without preparing candidates in advance.

Also, according to the phrase generation device in the second embodiment according to the present invention, by using a phrase generation model that includes an encoder to convert a phrase from a 2-tuple constituted with a phrase and a conjunctive expression or a relational label into a vector; and a decoder configured to generate a phrase having the relationship represented by the conjunctive expression or the relational label with respect to the phrase, from the converted vector and the conjunctive expression or the relational label, it is possible to generate a phrase having a relationship with an input phrase.

Also, by treating the label as an additional input to the encoder-decoder model, it becomes possible to generate different phrases depending on the label.

Third Embodiment

Principles of a Third Embodiment According to the Present Invention

Figure 14:
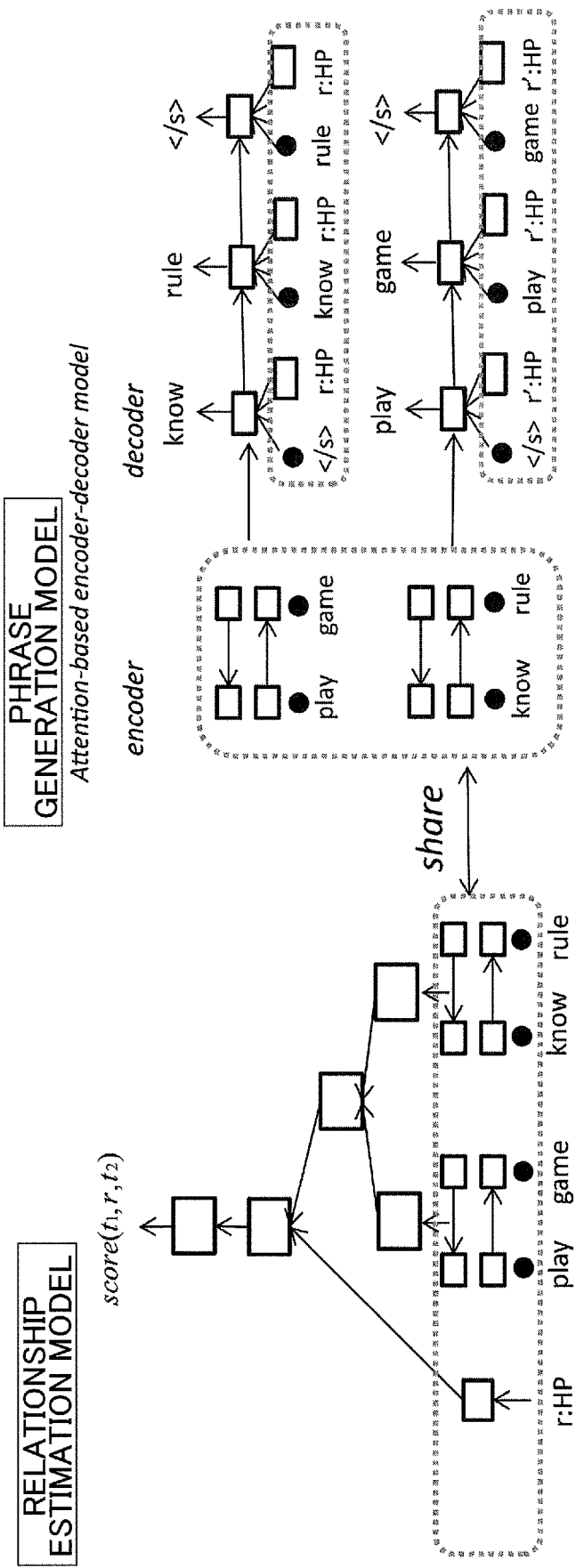
FIG. 14 is a diagram illustrating an example of a relationship estimation model and a phrase generation model.

In a third embodiment according to the present invention, a relationship estimation model and a phrase generation model as illustrated in FIG. 14 are learned at the same time. Specifically, the embedding for converting an input phrase into a sequence of word vectors, and a label into a vector; and the LSTM for converting a sequence of word vectors to a vector of a phrase, are shared between the relationship estimation model and the phrase generation model. Specific configurations of the respective models will be described below.

<Relationship Estimation Model>

First, a relationship estimation model in the third embodiment will be described.

As the basic structure of the model, a model similar to that of Non-Patent Document 2 cited above is used; however, the method of generating an input vector is different. In order to specifically describe this feature later, first, the model proposed in Non-Patent Document 2 will be described in detail.

In Non-Patent Document 2 cited above, when any 3-tuple of $\{t_1, t_2, r\}$ is given, a model for estimating the relational score$(t_1, r, t_2)$ of the 3-tuple is defined using a neural network as follows.

[Formula 5]

$$\text{score}(t_1,r,t_2)=W_2 g(W_1 v_{in}+b_1)+b_2 \quad (5)$$

where $$v_{in}=\text{concat}(v_{12},v_r), v_{12}\in \mathbb{R}^d \quad \text{[Formula 6]}$$

is a vector representation of a sequence of words obtained by concatenating $t_1$ with $t_2$, and $$v_r \in \mathbb{R}^d \quad \text{[Formula 7]}$$

is a vector representation of a label r. Also, g represents a nonlinear function, and ReLU is used in Non-Patent Document 2 cited above. The score of the final layer is assumed to be a one-dimensional output. These can be considered together as a model that determines whether or not a given 3-tuple presents a correct combination.

Although the relationship estimation model in the present embodiment is also defined using substantially the same formulation as described above, $v_{in}$ is modeled in a different way from Non-Patent Document 2 cited above. In Non-Patent Document 2 cited above, as the vector representation of a phrase, two types of simple modeling are adopted, which are a mean of word vectors and max pooling of the LSTM. In contrast, in the relationship estimation model in the present embodiment, the vector of each phrase is defined using attention pooling of the LSTM as follows, where $x_j^i$ and $h_j^i$ represent the embedding of the j-th word in a phrase $t_i$, and the hidden layer vector of the LSTM, respectively.

[Formula 8]

$$h_j^i = BiLSTM(x_j^i, h_{j-1}^i)(i=1,2) \quad (6)$$

$$v_i = \sum_{j=1}^{J} \frac{\exp(e_t)}{\sum_{k=1}^{J} \exp(e_k)} h_j^i \quad (7)$$

$$e_k = v^\top \tanh(Wh_k) \quad (8)$$

$$v_{12} = Bilinear(v_1, v_2) \quad (9)$$

$$v_{in} = concat(v_{12}, v_r) \quad (10)$$

Here, $v_{in}$ is passed to an upper layer after batch normalization and dropout have been performed. The LSTM for vectorizing each phrase and the embedding of words and labels are shared with the phrase generation model described in the second embodiment described above.

<Learning>
<Loss Function>

In the present embodiment, learning is performed while considering the loss functions of the relationship estimation model and the phrase generation model at the same time. Specifically, learning is performed using a loss function expressed in the following formula.

[Formula 9]

$$L(\theta) = L_{triple} + \lambda L_{encdec} \quad (11)$$

where $\theta$ represents the model parameter, $L_{triple}$ represents the loss function of the relationship estimation model, and $L_{encdec}$ represents the loss function of the phrase generation model. The loss function $L_{triple}$ of the relationship estimation model is expressed by the following formula using the binary cross entropy that exhibits the best accuracy in the results in Non-Patent Document 2 by Li et al., cited above.

[Formula 10]

$$L_{triple}(\tau, l) = -\frac{1}{N}\sum_{n=1}^{N}(l\log\sigma(score(\tau)) + (1-l)\log(1 - \sigma(score(\tau)))) \quad (12)$$

where $\tau$ is a variable representing a 3-tuple, l is a binary variable that takes 1 for a positive example and 0 for a negative example, and $\sigma$ represents a sigmoid function. According to the formulation expressed as above, learning is performed such that, for any 3-tuple $\tau=\{t_1, t_2, r\}$, the score of a positive example takes a value closer to 1, and the score of a negative score takes a value closer to 0.

The loss functions of the encoder and decoder of the phrase generation model are substantially the same as in the second embodiment described above.

<Negative Example Sampling>

In the case of learning a binary classification model by using the binary cross entropy, negative examples need to be provided. In the present embodiment, negative examples are generated using random sampling that exhibits the best accuracy in the research of Non-Patent Document 2 cited above. Specifically, for each positive example of 3-tuple data $\tau=\{t_1, t_2, r\}$, data are generated that includes $\tau_{neg1}=\{t_1', t_2, r\}$, $\tau_{neg2}=\{t_1, t_2, r'\}$, and $\tau_{neg3}=\{t_1, t_2', r\}$, in which $t_1$, $t_2$, and r are randomly replaced, respectively. The randomly sampled $t_1'$ and $t_2'$ are sampled respectively from among candidates that appeared during learning, and r' is sampled from among all the label candidates. Therefore, during the learning, the learning is performed while sampling three negative examples per positive example. However, negative examples are used only in the relationship estimation model. This is because it is desirable for the phrase generation model to learn from correct 3-tuples, only positive examples of 3-tuples are used for the learning.

Configuration of a Learning Device of Phrase Generation and Relationship Estimation Models in the Third Embodiment According to the Present Invention Next, a configuration of a learning device of phrase generation and relationship estimation models in the third embodiment according to the present invention will be described. Note that the configuration of the learning device of phrase generation and relationship estimation models is substantially the same as that of the learning device of a relationship estimation model in the first embodiment; therefore, the same reference numerals are assigned to omit the description.

The learning device of phrase generation and relationship estimation models in the third embodiment according to the present invention includes an input unit 50, an arithmetic/logic unit 60, and an output unit 90.

The learning unit 63 of the arithmetic/logic unit 60 learns a phrase generation model and a relationship estimation model at the same time. The phrase generation model includes an encoder configured to convert a phrase into a vector, by using, as correct data in learning, a 3-tuple of {phrase 1, phrase 2, label} extracted by the training data generation unit 62, and a 2-tuple of {phrase 1, label}→phrase 2 and a 2-tuple of {phrase 2, label'}→phrase 1 obtained from the 3-tuple of {phrase 1, phrase 2, label}, and by further using negative examples obtained from the 3-tuple of {phrase 1, phrase 2, label}; and a decoder configured to generate a phrase having a relationship indicated by the label with respect to the phrase based on the converted vector and the label. The relationship estimation model is a neural network that outputs a relational score from a vector representing each phrase included in a combination of phrases that are converted using a common encoder, and a vector representing the label.

Specifically, the parameters of the phrase generation model and the relationship estimation model are updated so as to minimize the loss function of Formula (11) above.

Configuration of a Phrase Generation Device in the Third Embodiment According to the Present Invention Next, a configuration of a phrase generation device in the third embodiment according to the present invention will be described. Note that for the parts that have the same configuration as in the second embodiment, the same reference numerals are assigned to omit the description.

Figure 15:
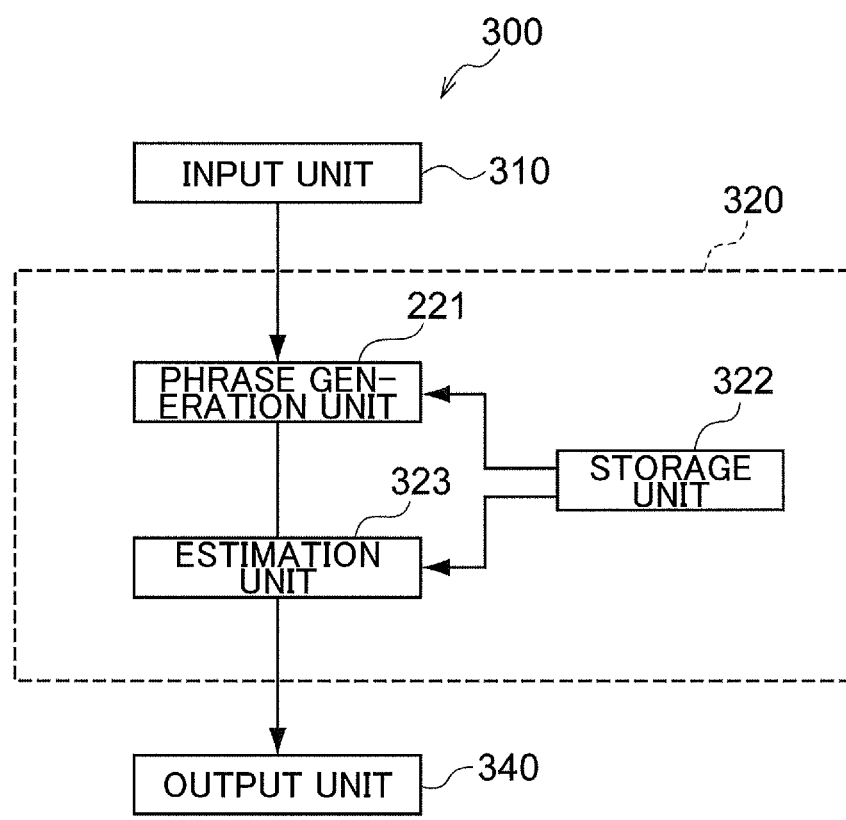
FIG. 15 is a block diagram illustrating a configuration of a phrase generation device in a third embodiment according to the present invention.

As illustrated in FIG. 15, a phrase generation device 300 in the third embodiment according to the present invention can be configured with a computer that includes a CPU, a RAM, and a ROM storing a program and various items of data for executing a processing routine of phrase generation, which will be described later. As illustrated in FIG. 15, this phrase generation device 300 functionally includes an input unit 310, an arithmetic/logic unit 320, and an output unit 340.

The input unit 310 receives a 2-tuple constituted with an input phrase (text) and a label that represents a relationship between phrases.

The arithmetic/logic unit 320 includes a phrase generation unit 221, a memory 322, and an estimation unit 323.

The memory 322 stores a relationship estimation model and a phrase generation model learned by the learning device of phrase generation and relationship estimation models.

As illustrated in FIG. 14, it is assumed that for the phrase generation model, an attention-based encoder-decoder model is used as described above; and for the relationship estimation model, a neural network model is used that converts a vector of each phrase by using attention pooling of the LSTM as described above.

The phrase generation unit 221 uses the phrase generation model stored in the memory 322 to generate a phrase that has a relationship indicated by the label with respect to the input phrase of the input 2-tuple, and outputs to the estimation unit 323.

The estimation unit 323 uses the relationship estimation model stored in the memory 322 to estimate a relational score for a 3-tuple constituted with the input 2-tuple and a phrase generated by the phrase generation unit 221, and causes the output unit 340 to output the estimated score.

At this time, in the relationship estimation model, the estimation unit 323 converts each phrase into a vector by using the neural network common to the encoder of the phrase generation model, to estimate the relational score.

Operations of the Learning Device of Phrase Generation and Relationship Estimation Models in the Third Embodiment According to the Present Invention Next, operations of the learning device of phrase generation and relationship estimation models in the third embodiment according to the present invention will be described. Once having received an input text by the input unit 310, the learning device of phrase generation and relationship estimation models executes a processing routine that is substantially the same as the processing routine of learning a relationship estimation model illustrated in FIG. 9, to learn a phrase generation model and a relationship estimation model at the same time, by using, as correct data in learning, a generated 3-tuple of {phrase 1, phrase 2, label}, and a 2-tuple of {phrase 1, label}→phrase 2 and a 2-tuple of {phrase 2, label'}→phrase 1 obtained from the 3-tuple of {phrase 1, phrase 2, label}, and by further using negative examples obtained from the 3-tuple of {phrase 1, phrase 2, label}.

Figure 16:
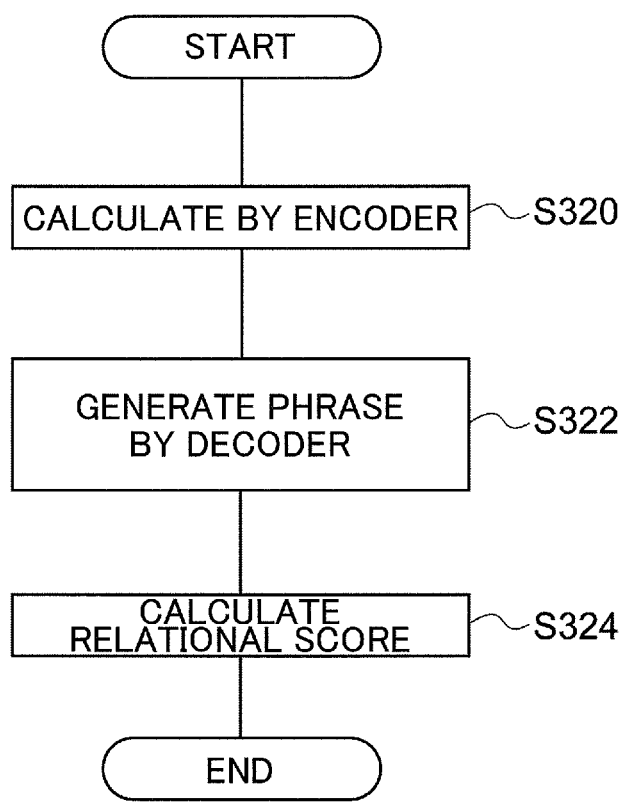
FIG. 16 is a flow chart illustrating a processing routine of phrase generation in a phrase generation device in the third embodiment according to the present invention.

Operations of the Phrase Generation Device in the Third Embodiment According to the Present Invention Next, operations of the phrase generation device 300 in the third embodiment according to the present invention will be described. When a relationship estimation model and a phrase generation model learned in advance by the learning device of phrase generation and relationship estimation models is input into the phrase generation device 300, the phrase generation device 300 stores the relationship estimation model and the phrase generation model in the memory 322. Then, when the input unit 310 receives a 2-tuple of {phrase 1, label} to be estimated, the phrase generation device 300 executes a processing routine of phrase generation illustrated in FIG. 16.

At Step S320, the phrase generation device 300 converts the phrase 1 included in the 2-tuple received by the input unit 310 into a vector by the LSTM of the encoder of the phrase generation model.

At Step S322, the phrase generation device 300 uses the attention-based decoder of the phrase generation model to generate a phrase from the vector converted at Step S320 and the vector representing the label included in the 2-tuple, and sets the generated phrase as the phrase 2 having a relationship indicated by the label with respect to the phrase 1.

At Step S324, the phrase generation device 300 calculates the relational score based on the 3-tuple constituted with the 2-tuple received by the input unit 310 and the phrase generated at Step S322, and the relationship estimation model, causes the output unit 340 to output the 3-tuple together with the calculated relational score, and ends the processing routine of phrase generation.

As described above, according to the learning device of phrase generation and relationship estimation models in the third embodiment according to the present invention, learning is performed for a phrase generation model that includes an encoder configured to convert a phrase into a vector, and a decoder configured to generate a phrase having a relationship represented by a conjunctive expression or a relational label with respect to a phrase; and for a relationship estimation model that outputs a relational score, upon receiving as input a vector that represents each phrase included in a combination of phrases converted by using the encoder, and a vector that represents the conjunctive expression or the relational label. In this way, it is possible to learn, at the same time, the relationship estimation model that can precisely estimate the relationship between the phrases, and the phrase generation model that can generate a phrase having the relationship with the input phrase. Also, the accuracy of the relationship estimation model of 3-tuples is improved by simultaneously learning the phrase generation model and the relationship estimation model in which some of the neural networks are common.

Also, according to the phrase generation device in the third embodiment according to the present invention, by using a phrase generation model that includes an encoder configured to convert a phrase into a vector; and a decoder configured to generate a phrase having a relationship represented by a conjunctive expression or a relational label with respect to a phrase, to generate a phrase that has a relationship with the input phrase, and by using a relationship estimation model that outputs a relational score, to estimate the relational score, it is possible to generate a phrase having a relationship with respect to the input phrase, along with the relational score.

Experiments

Experimental Data

As the experimental data, data of ConceptNet (in English) disclosed with Non-Patent Document 2 cited above, and open-domain data in Japanese annotated by the inventors independently were used. Table 1 shows an overview of the respective data sets.

TABLE 1

|  | ConceptNet | Ja |
|---|---|---|
| train | 100,000 | 192,714 |
| validation1 | 1,200 | 6,889 |
| validation2 | 1,200 | — |
| test | 2,400 | 6,889 |
| Number of relational labels | 34 | 7 |
| Level of vocabulary | 21,471 | 18,119 |
| Mean number of words in phrase | 2.02 | 3.96 |

ConceptNet has a larger number of labels. Although the level of vocabulary is around 20,000 words in both sets, the mean number of words in a phrase is approximately two times longer for the data in Japanese than in ConceptNet. As for the data in Japanese, frequently appearing words on the Web were crawled using crowdsourcing, to create 3-tuples of $\{t_1, t_2, r\}$ that are related to the crawled words. In order to remove noise data, for each 3-tuple of $\{t_1, t_2, r\}$ created by one creator, in a state of r being hidden, three other workers were asked to perform a task of selecting an appropriate r, and only 3-tuple of data for which the same label was selected by two or more persons was adopted. Also, test data and validation data were randomly selected from among data for which the same r was selected by everyone, and the rest were used as training data. As in ConceptNet data, test and validation data in Japanese were generated so that the ratio of positive examples and negative examples was 1:1.

Specifically, after sampling the positive examples first, one of the elements in each 3-tuple in the positive examples was randomly selected and replaced with another element in the test data, to generate data of negative examples.

<Evaluation Method and Comparison Method>

Methods described (DNN AVG, DNN LSTM) in Non-Patent Document 2 cited above were used as the baseline of the relationship estimation model. In these methods, the input vector $v_{in}$ is the mean of word vectors or max pooling of the LSTM. However, in the LSTM model, $t_1$ and $t_2$ were vectorized separately and concatenated.

With respect to the proposed methods in the present embodiment, the accuracy was evaluated in the case of using the relationship estimation model alone (proposed w/o EncDec), and in the case of learning both at the same time (proposed w/EncDec). The percentage of correct answers obtained by binary determination was used as the evaluation index. Also, as for the experiment of ConceptNet, as in Non-Patent Document 2 cited above, learning was performed with the train data, and the hyperparameters were adjusted with the validation 1 data, and evaluated with the validation 2 data and the test data. Similarly, the parameters in the data in Japanese were determined with data of the train, validation 1 and 2, and evaluated with the test data.

As the baseline of the phrase generation model, a single encoder-decoder model (EncDec w/o relation (single)) that does not use relational labels was used. Also, a single model (EncDec w/relation (single)) taking relational labels into account was compared with simultaneous learning with the relationship estimation model (EncDec w/relation (Multi)). The evaluation was performed with the word-level accuracy.

<Settings of Experiment>

The parameters used in the present experiment will be described. The hidden layer of the LSTM, and the embedding of words and labels were set to have 200 dimensions, the intermediate layer of the relationship estimation model was set to have 10001 dimensions, the batch size in learning was set to 128, the dropout was set to 0.2, and the weight decay was set to 0.00001. Also, a single-layer bidirectional LSTM was used as the encoder of the phrase generation model, and a single-layer LSTM was used as the decoder. SGD was used as the optimization method, the initial learning rate was set to 1.0, and the attenuation rate was set to 0.5, to perform scheduling.

Also, l of the loss function 1 was fixed to 1.0. As initial values of the embedding of words and labels, vectors that were calculated in advance using fastText (see Reference 4) based on a text file combining training data of 3-tuples and Wikipedia® were used.

[Reference 4]

Piotr Bojanowski, Edouard Grave, Armand Joulin, and Tomas Mikolov, "Enriching word vectors with subword information", arXiv preprint arXiv:1607.04606, 2016

<Experimental Results>

<Estimation of Relationship>

Table 2 shows the evaluation results of the estimation of relationships (binary classification).

TABLE 2

|  | ConceptNet | | Ja |
|---|---|---|---|
| method | valid2 | test | test |
| base (DNN AVG) | 0.905 | 0.923 | 0.889 |
| base (DNN LSTM) | 0.910 | 0.928 | 0.877 |
| proposed w/o EncDec | 0.911 | 0.927 | 0.881 |
| proposed w/EncDec | 0.928 | 0.938 | 0.897 |
| proposed w/EncDec (+data) | 0.936 | 0.948 | — |
| proposed w/EncDec (+augdata) | — | — | 0.897 |
| Li et al [5] | 0.913 | 0.920 | — |
| Li et al (+data)[5] | 0.918 | 0.925 | — |
| human [5] | ~0.950 | — | — |

The lower rows show the best accuracy reported in the article of Non-Patent Document 2 cited above. Here, the row including "+data" shows an evaluation in the case where the training data was increased from 100 k to 300 k. The results in Table 2 show that the proposed method in the embodiment according to the present invention has improved the accuracy compared to the existing method, and with the data of ConceptNet, results were obtained that exceed the best values in the previous studies. In particular, the accuracy was improved by over 2% under the condition of increased data, and approached the upper limit (~0.95) by human. Comparing the single model (proposed w/o EncDec) with the simultaneous learning model (proposed w/EncDec), it can be seen that both in the data of ConceptNet and the data in Japanese, the simultaneous learning resulted in better accuracy than in the case of the single model. This is because, in the relationship estimation problem, the loss function of the phrase generation problem works as a constraint, and thereby, a better phrase vector was obtained.

<Phrase Generation>

Table 3 shows the accuracy of the phrase generation model.

TABLE 3

| method | ConceptNet | | Ja |
| --- | --- | --- | --- |
| | valid2 | test | test |
| EncDec w/o relation (single) | 0.535 | 0.564 | 0.529 |
| EncDec w/relation (single) | 0.598 | 0.633 | 0.544 |
| EncDec w/relation (Multi) | 0.602 | 0.633 | 0.542 |
| EncDec w/relation (Multi + augdata) | — | — | 0.553 |

From the results, it can be seen that there is a significant difference in accuracy between the baseline and the encoder-decoder model taking the relationship into account, and that the accuracy of generation is significantly improved by taking relational labels into account. Although multitask learning did not seem to bring significant improvement of the accuracy on the phrase generation model side, by adding data for unsupervised learning, it is also possible to improve the accuracy of the phrase generation model.

Figure 17:
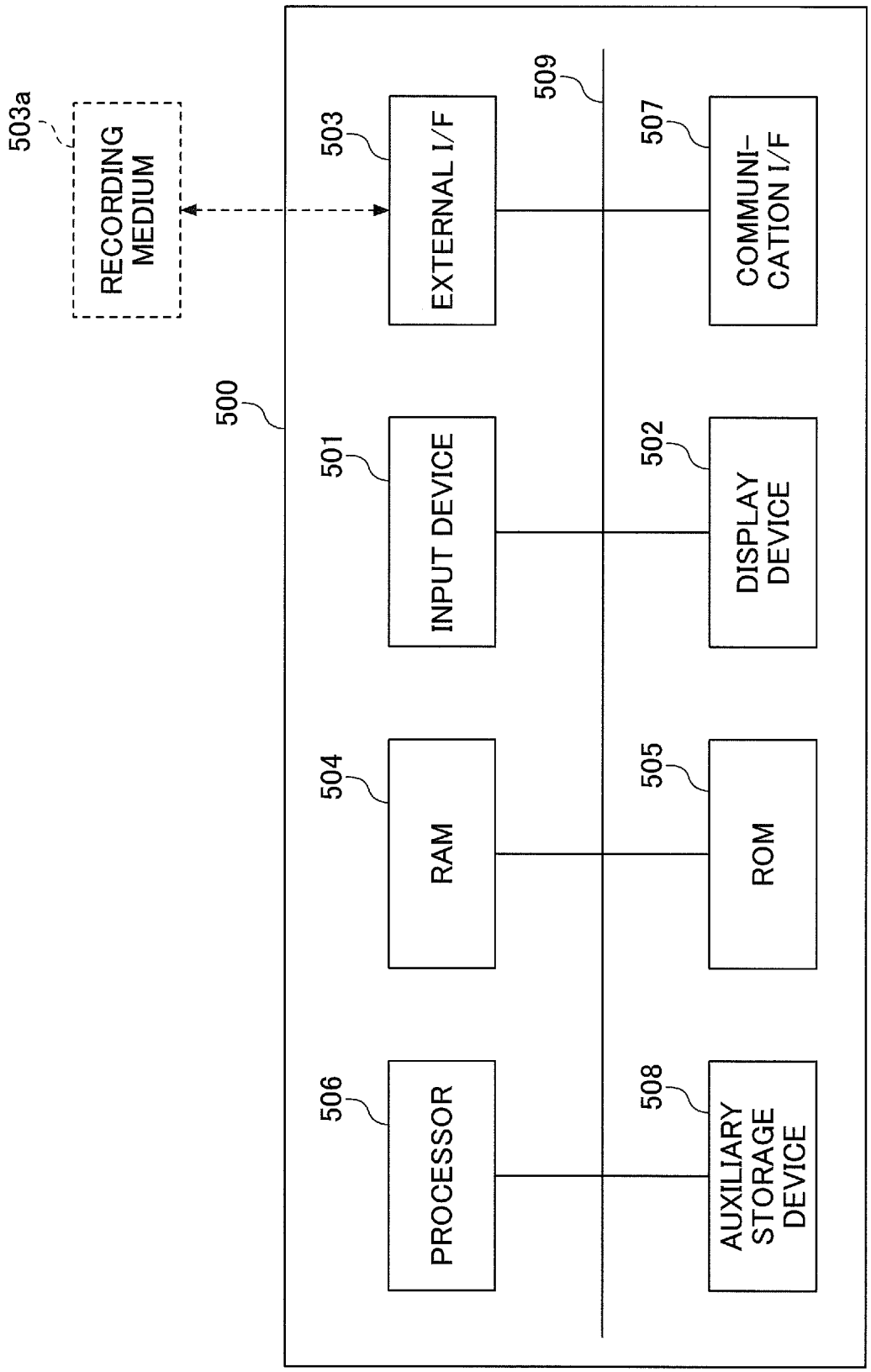
FIG. 17 is a block diagram illustrating a hardware configuration of a computer.

Finally, a hardware configuration of a computer will be described that implements the learning device of a relationship estimation model, the relationship estimation device, the phrase generation device, the learning device of a phrase generation model, and the learning device of phrase generation and relationship estimation models in the embodiments according to the present invention. As illustrated in FIG. 17, a computer 500 includes as hardware, for example, an input device 501, a display device 502, an external I/F 503, a RAM 504, a ROM 505, a processor 506, a communication I/F 507, and an auxiliary storage device 508. Also, these hardware components are connected via a bus 509 so as to be capable of communicating with each other.

The input device 501 is, for example, a keyboard, a mouse, a touch panel, and the like. The display device 502 is, for example, a display or the like. Note that the computer 500 may not include at least one of the input device 501 and the display device 502.

The external I/F 503 is an interface with an external recording medium such as a recording medium 503a. As the recording medium 503a, for example, a flexible disk, a CD, a DVD, an SD memory card, a USB memory card, and the like may be listed.

The RAM 504 is a volatile semiconductor memory that temporarily holds programs and data. The ROM 505 is a non-volatile semiconductor memory that can hold programs and data even when the power is turned off.

The processor 506 is, for example, a CPU, a GPU, and the like. The communication I/F 507 is an interface for connecting the computer 500 to a communication network. The auxiliary storage device 508 is, for example, an HDD, an SSD, and the like.

Note that the learning device of a relationship estimation model, the relationship estimation device, the phrase generation device, the learning device of a phrase generation model, and the learning device of phrase generation and relationship estimation models may be implemented by a single unit of computer 500 or may be implemented by multiple units of computers 500. Also, the computer 500 may include multiple processors 506 and multiple memories (such as the RAM 504, the ROM 505, the auxiliary storage device 508, etc.).

Note that the present invention is not limited to the embodiments described above, and various modifications and applications can be made within a range not deviating from the gist of the present invention.

For example, although the embodiments have been described as above with example cases in which the relationship estimation device 100 and the learning device of a relationship estimation model 150 are configured as separate devices, the relationship estimation device 100 and the learning device of a relationship estimation model 150 may be configured as one device. Also, although the example cases have been described in which the phrase generation devices 200, 300, the learning device of a phrase generation model, and the learning device of phrase generation and relationship estimation models are configured as separate devices, the phrase generation devices 200, 300, and the learning device of a phrase generation model may be configured as a single device.

The learning device of a relationship estimation model, the relationship estimation device, the phrase generation device, the learning device of a phrase generation model, and the learning device of phrase generation and relationship estimation models described above include a computer system internally; in the case of using the WWW system, the "computer system" is assumed to include a home page providing environment (or display environment)

The present application is based on a base application No. 2018-038054, filed on Mar. 2, 2018, in Japan, the entire contents of which are hereby incorporated by reference.

LIST OF REFERENCE SYMBOLS 10, 50, 210, 310 input unit
20, 60, 220, 320 arithmetic/logic unit
21 and 323 estimation unit
22, 222, 322 memory
40, 90, 240, 340 output unit
62 training data generation unit
63 learning unit
71 basic analysis unit
72 phrase extraction unit
73 conjunctive expression database
100 relationship estimation device
150 learning device of a relationship estimation model
200, 300 phrase generation devices
221 phrase generation unit

The invention claimed is:

1. A learning device of a phrase generation model comprising:
a memory; and
a processor,
wherein the phrase generation model is an encoder-decoder model configured as neural networks including an encoder and a decoder,
wherein the processor is configured to execute learning the phrase generation model, and the learning of the phrase generation model is executed by updating parameters of neural networks,
the learning uses, as training data, a 3-tuple including a combination of phrases and at least one of a conjunctive expression representing a relationship between the phrases or a relational label indicating the relationship represented by the conjunctive expression, wherein the encoder is configured to convert a phrase into a vector using a 2-tuple including one of the phrases in the 3-tuple and the at least one of the conjunctive expression or the relational label in the 3-tuple, wherein the learning uses, as correct answer data, another of the phrases in the 3-tuple corresponding to the 2-tuple, and wherein the decoder is configured to generate, from the converted vector and either the conjunctive expression or the relational label, a phrase having the relationship represented by the conjunctive expression or the relational label with respect to the phrase.

2. The learning device of the phrase generation model as claimed in claim 1, wherein the processor further executes:

extracting a combination of phrases that have a predetermined relationship with a clause including a predetermined conjunctive expression representing a relationship between the phrases, based on a result of text analysis with respect to an input text, and generating the 3-tuple constituted with a combination of the extracted phrases and at least one of the conjunctive expression and the relational label indicating the relationship represented by the conjunctive expression, wherein the learning learns the phrase generation model, by using the generated 3-tuple as the training data.

3. A phrase generation device comprising:

a memory; and a processor, wherein the processor is configured to execute:

receiving as input a 2-tuple constituted with an input phrase and at least one of a conjunctive expression or a relational label representing a relationship between phrases; and generating a phrase having the relationship represented by the conjunctive expression or the relational label with respect to the input phrase, based on a phrase generation model that have learned in advance, wherein the phrase generation model is an encoder-decoder model configured as neural networks including an encoder and a decoder, the phrase generation model has learnt in advance by using, as correct answer data, another of the phrases in the 3-tuple training data corresponding to the 2-tuple training data and by updating parameters of neural networks, the encoder is configured to convert the input phrase into a vector using the 2-tuple including one of the phrases in a 3-tuple and the at least one of the conjunctive expression or the relational label in the 3-tuple, and the decoder is configured to generate, from the converted vector and either the conjunctive expression or the relational label, a phrase having the relationship represented by the conjunctive expression or the relational label with respect to the phrase.

4. A method of learning a phrase generation model, the method executed by a processor, the method comprising:

learning the phrase generation model using, as training data, a 3-tuple including a combination of phrases and at least one of a conjunctive expression representing a relationship between the phrases or a relational label indicating the relationship represented by the conjunctive expression, wherein the phrase generation model is an encoder-decoder model configured as neural networks including an encoder and a decoder, wherein the learning of the phrase generation model further comprises updating parameters of neural networks, wherein the encoder is configured to convert a phrase into a vector using a 2-tuple including one of the phrases in the 3-tuple and the at least one of the conjunctive expression or the relational label in the 3-tuple, wherein the learning further comprises using, as correct answer data, another of the phrases in the 3-tuple corresponding to the 2-tuple, and wherein the decoder is configured to generate, from the converted vector and either the conjunctive expression or the relational label, a phrase having the relationship represented by the conjunctive expression or the relational label with respect to the phrase.

5. A non-transitory computer-readable recording medium having computer-readable instructions stored thereon, which when executed, cause a computer to execute the method of learning the phrase generation model as claimed in claim 4.

6. A method of generating a phrase executed by a processor, the method comprising:

receiving as input a 2-tuple constituted with an input phrase and at least one of a conjunctive expression or a relational label representing a relationship between phrases; and generating a phrase having the relationship represented by the conjunctive expression or the relational label with respect to the input phrase, based on a phrase generation model that have learned in advance, wherein the phrase generation model is an encoder-decoder model configured as neural networks including an encoder and a decoder, the phrase generation model has learnt in advance by using, as correct answer data, another of the phrases in the 3-tuple training data corresponding to the 2-tuple training data and by updating parameters of neural networks, the encoder is configured to convert the input phrase into a vector using the 2-tuple including one of the phrases in a 3-tuple and the at least one of the conjunctive expression or the relational label in the 3-tuple, and the decoder is configured to generate, from the converted vector and either the conjunctive expression or the relational label, a phrase having the relationship represented by the conjunctive expression or the relational label with respect to the phrase.

* * * * *